United States Patent [19]

Michalko et al.

[11] 3,972,833

[45] Aug. 3, 1976

[54] HYDROTREATING CATALYST

[75] Inventors: Edward Michalko, Chicago; Lee Hilfman, Mount Prospect, both of Ill.

[73] Assignee: Universal Oil Products Company, Des Plaines, Ill.

[22] Filed: Dec. 17, 1974

[21] Appl. No.: 533,578

[52] U.S. Cl. .......................... 252/453; 252/455 R; 252/458; 252/459
[51] Int. Cl.² ..................... B01J 37/02; B01J 29/06
[58] Field of Search ................ 252/453, 451, 455 R

[56] References Cited
UNITED STATES PATENTS 3,274,124  9/1966  O'Hara ............................... 252/451
3,437,603  4/1969  Hilfman ............................. 252/453

Primary Examiner—Carl F. Dees
Attorney, Agent, or Firm—James R. Hoatson, Jr.; Robert W. Welch; William H. Page, II

[57] ABSTRACT

A catalytic composite comprising a Group VIB and a Group VIII metal or metal oxide on a silica-alumina support or carrier material. A catalytic composite particularly useful for the hydrotreating or hydrorefining of petroleum hydrocarbon fractions results from the use of a silica-alumina support or carrier material formed by the gelation of a suspension of an insoluble basic aluminum sulfate in an acidic silica sol.

9 Claims, No Drawings

HYDROTREATING CATALYST

This invention relates to a catalytic composite particularly useful in the hydrotreating of petroleum fractions such as heavy atmospheric and light vacuum gas oils. Hydrotreating is an established and well-known process designed to treat a petroleum fraction or fractions in the presence of hydrogen at conditions to promote certain hydrogen-consuming reactions including hydrogenation, hydrodesulfurization, and destructive hydrogenation or hydrocracking. Catalytic hydrotreating is generally useful to improve the quality of a petroleum fraction otherwise unfit for use, or to convert higher boiling petroleum fractions to lower boiling products more useful in themselves or as a feed stock for other hydrocarbon conversion processes such as reforming. Catalytic hydrotreating is particularly useful for the destructive hydrogenation of higher boiling petroleum fractions to form lower boiling more useful products, with the sulfurous and nitrogenous compounds typically present in said petroleum fractions being converted to readily separable hydrogen sulfide and ammonia in the process.

Hydrotreating is generally effected at reaction conditions including an imposed hydrogen pressure of from about 100 to about 3000 psig. Normally, the hydrogen is charged together with recycle hydrogen to provide from about 1000 to about 50,000 standard cubic feet per barrel of hydrocarbon charge. Hydrotreating reaction conditions further include an elevated temperature of from about 95° to about 425° C., although temperatures in the upper range, say from about 315° to about 425° C., are more suitable. Also, a petroleum feed stock is suitably processed over the hydrotreating catalyst at a liquid hourly space velocity of from about 0.5 to about 20.

Hydrotreating catalysts typically comprise a Group VIB metal or metal oxide in combination with a Group VIII metal or metal oxide on a refractory inorganic oxide support or carrier material. It is an object of this invention to present a novel catalytic composite of a Group VIB and Group VIII metal and/or metal oxide and a silica-alumina support or carrier material, said carrier material being characterized by its method of manufacture. The catalytic composite of this invention is particularly useful to catalyze the destructive hydrogenation of higher boiling, highly paraffinic petroleum fractions to form lower boiling distillate fuels characterized by a pour point of less than about −5° F.

In one of its broad aspects, the present invention embodies a catalytic composite of from about 5 to about 20 wt. % Group VIB metal or metal oxide and from about 0.1 to about 10 wt. % Group VIII metal or metal oxide on a silica-alumina carrier material, said carrier material having been prepared by forming a stable suspension of an insoluble basic aluminum sulfate characterized by a $SO_3/Al_2O_3$ mole ratio of from about 0.4 to about 0.6 and a particle size of from about 1 to about 10 microns with a silica sol characterized by a pH of from about 1 to about 3; dispersing the suspension as droplets in a hot, water-immiscible suspending media, and retaining the droplets therein until they set to firm spheroidal hydrogel particles; aging the spheroidal hydrogel particles in an aqueous alkaline solution at conditions to hydrolyze the residual basic aluminum sulfate contained therein; washing, drying and calcining the aged spheroidal particles.

Other objects and embodiments of this invention will become apparent in the following detailed specification.

The basic aluminum sulfate utilized in the preparation of the silica-alumina carrier material is characterized by an $SO_3/Al_2O_3$ mole ratio of from about 0.4 to about 0.6 and is employed in a particle size of from about 1 to about 10 microns. The basic aluminum sulfate can be prepared by admixing an aqueous aluminum sulfate solution with an aqueous ammonium hydroxide solution at conditions to form a common solution with a pH of from about 5.5 to about 6.5. The basic aluminum sulfate which precipitates from this solution is a readily filterable material and, when air dried, will have a particle size in the 1 to 10 micron range. Sufficient of this basic aluminum sulfate can be maintained as a stable suspension in the hereinafter described acidic silica sol to provide a silica-alumina carrier material comprising up to about 60 wt. % alumina.

The aforementioned acidic silica sol is obtainable by several alternative procedures. For example, a suitable mineral acid such as hydrochloric acid, sulfuric acid, etc., is added to an aqueous alkali metal silicate solution, generally an aqueous sodium silicate solution commonly referred to as water glass. Preferably, the order of addition is reversed, the water glass being added to the acid. The latter technique is preferred since the formation of the silica sol always occurs under acid conditions which preclude the premature gelation of the sol. When using sulfuric or hydrochloric acids, concentrations in the 10–30% range are satisfactory, and the sodium silicate solution, or water glass, is first diluted with water to establish a silica concentration in the range of from about 5 to about 16 wt. %. The water glass is admixed with the acid at a temperature of less than about 35° C. and with agitation to inhibit the polymerization of the resulting silicic acid and premature gelation. At this stage, the silica sol will have a pH in the range of from about 1 to about 3, and the aforesaid basic aluminum sulfate may be commingled therewith to form a stable suspension.

Pursuant to the present invention, the suspension comprising a basic aluminum sulfate and an acidic silica sol is dispersed as droplets in a hot, water-immiscible, suspending media and retained therein until they set to firm hydrogel particles. The aforesaid method, commonly referred to as the oil-drop method, provides for the passage of the droplets through the water-immiscible suspending media — usually a light gas oil chosen principally for its high interfacial tension with respect to water. Passage of the droplets through the suspending media produces two effects. First, as each droplet penetrates the surface it draws into a spherical shape. The droplets are principally water at this stage, and being insoluble in the oil, they tend to draw into a shape resulting in the least surface area for their volume. The second effect is that the formed spheres are given time to gel and build an initial structure while gravitating to the bottom of the suspending media so that sufficient structural stability is established to resist the strains imposed by the transfer and subsequent treatment of the spheroidal particles.

In accordance with the method of this invention, the spheroidal hydrogel particles are transferred from the water-immiscible suspending media to an aqueous alkaline aging solution, suitably an aqueous ammoniacal solution. The spheres are retained in the aging solution for a relatively brief period permitting substantially complete hydrolysis of the residual basic aluminum sulfate content thereof. Preferably, the spheres are retained in the aging solution for a period of from about ½ to about 2 hours at a temperature of from about 50° to about 105° C. It will be appreciated that the relatively low $SO_3/Al_2O_3$ mole ratio of the basic aluminum sulfate starting material will permit a substantially less tedious washing process for the separation of sulfate from the spheroidal hydrogel product. Thus, the aged spheres are washed with an aqueous alkaline solution followed by a water-wash, suitably at room temperature, to reduce the sulfate content thereof, preferably to less than about 0.5 wt. %. The spheres may be washed in any suitable manner. A particularly suitable method is to wash the spheres by percolation, either with an upward or downward flow of water, or aqueous alkaline solution as the case may be. After washing, the spheres may be dried at a temperature up to about 315° C., or dried at this temperature and then calcined or oxidized at a temperature of from about 325° to about 750° C. for 2 to 12 hours or more.

The catalytic composite of this invention further comprises a Group VIB metal or metal oxide and a Group VIII metal or metal oxide composited with the described silica-alumina carrier material. Thus, the catalytic composite may comprise chromia, molybdenum, and/or tungsten in the reduced or oxidized form in combination with one or more metals or oxides of a metal of Group VIII, i.e., iron, nickel, cobalt, platinum, palladium, ruthenium, rhodium, osmium and iridium. Of the Group VIB metals, molybdenum and tungsten are preferred. The Group VIB metal is suitably employed in an amount to comprise from about 5 to about 20 wt. % of the final catalytic composite. The Group VIII metal, which is preferably nickel, or nickel in combination with cobalt, is suitably effective in amounts to comprise from about 0.1 to about 10 wt. % of the final catalytic composite. The Group VIB and the Group VIII metal component may be composited with the carrier material in any suitable manner. For example, the silica-alumina carrier material can be soaked, dipped, suspended or otherwise immersed in a common solution comprising a suitable compound of a Group VIB metal and a suitable Group VIII metal compound. Alternatively, a Group VIB metal and a Group VIII metal may be composited with the carrier material utilizing individual solutions thereof and in any convenient sequence. Suitable compounds of Group VIB metals include ammonium molybdate, ammonium paramolybdate, molybdic acid, molybdenum trioxide, ammonium chromate, ammonium peroxychromate, chromium acetate, chromous chloride, chromium nitrate, ammonium metatungstate, tungstic acid, etc. Compounds of metals of Group VIII which are suitable include nickel nitrate, nickel sulfate, nickel chloride, nickel bromide, nickel fluoride, nickel iodide, nickel acetate, nickel formate, cobaltous nitrate, cobaltous sulfate, cobaltous fluoride, ferric fluoride, ferric bromide, ferric chloride, ferric nitrate, ferric sulfate, ferric formate, ferric acetate, platinum chloride, chloroplatinic acid, chloropalladic acid, palladium chloride, and the like.

The resulting composite, after all of the catalytic components are present therein, is usually dried for a period of from about 2 to about 8 hours or more in a steam dryer, then from about 100° to about 460° C. in a drying oven. The dried catalyst composite is thereafter oxidized in an oxygen containing atmosphere, such as air, for a period of from about 1 to about 8 hours or more and at a temperature of from about 370° to about 650° C.

While is is not essential, it is preferred that the resultant calcined catalyst composite be treated in a reducing atmosphere prior to use in the conversion of hydrocarbons. The step is designed to insure a uniform and finely divided dispersion of the catalytic components throughout the carrier material. Preferably, substantially pure and dry hydrogen is used as the reducing atmosphere in this step. The calcined catalyst is suitably treated in the reducing atmosphere at a temperature of from about 425° to about 650° C. for a period of from about 0.5 to about 10 hours or more.

The catalyst may, in some cases, be beneficially subjected to a presulfiding operation designed to incorporate in the catalytic composite from about 0.05 to about 0.50 wt. % sulfur calculated on an elemental basis. Preferably, this presulfiding treatment takes place in the presence of hydrogen and a suitable sulfur-containing compound such as hydrogen sulfide, lower molecular weight mercaptans, organic sulfides, etc. Typically, this procedure comprises treating the catalyst with a sulfiding gas such as a mixture of hydrogen and hydrogen sulfide having about 10 moles of hydrogen per mole of hydrogen sulfide at conditions sufficient to effect the desired incorporation of sulfur, generally including a temperature ranging from about 25° to about 600° C. or more. It is generally a good practice to perform this presulfiding step under substantially water-free conditions.

The following examples are presented in illustration of the method of this invention and are not intended as an undue limitation on the generally broad scope of the invention as set out in the appended claims.

EXAMPLE I

A basic aluminum sulfate was prepared by admixing about 500 cc of water with 3 cc of a 28% aqueous aluminum sulfate solution. The pH of the solution was then adjusted to about 6 by the addition thereto of a 15% aqueous ammonium hydroxide solution. Thereafter, the pH of the solution was maintained at this level by the concurrent addition of a 28% aqueous aluminum sulfate solution and a 15% aqueous ammonium hydroxide solution thereto, and addition being at a rate to provide about 1.7 volumes of aluminum sulfate solution per volume of ammonium hydroxide solution. The resulting basic aluminum sulfate precipitate was filtered, washed free of soluble sulfate, and reslurried to 13.6% $Al_2O_3$ equivalent concentration (7.2% Al, 5.6% $SO_4$). About 300 grams of the basic aluminum sulfate slurry was added to 435 cc of an acidic silica sol at 7° C. to form a stable suspension. The silica sol was prepared by the acidification of 315 cc of 16 wt. % water glass solution with 120 cc of a 20% hydrochloric acid solution. Silica-alumina hydrogel spheres were formed by the described oil-drop method at 95° C. The hydrogel spheres were aged for about one-half hour at 95° C. in 750 cc of a 5% aqueous ammoniacal solution, washed for about 15 minutes at room temperature with 700 cc of an aqueous ammoniacal solution containing 50 cc of a 28% ammonium hydroxide solution, and finally water-washed. After three 15 minute water-washings with 750 cc of water each, the sulfate level was reduced to 0.3 wt. %. The spheres were subsequently dried and calcined in air at 650° C. for 2 hours. The silica-alumina product consisted of one-sixteenth inch spheres with an average bulk density of 0.60 grams per cc.

The silica alumina carrier material (90.2 grams) was immersed in 100 cc of an aqueous impregnating solution containing 27.9 grams of ammonium metatungstate and 44.6 grams of nickelous nitrate. The solution was evaporated to dryness in contact with the carrier material utilizing a steam-jacketed rotary evaporator. After 1 hour of calcining in air at 595° C., the spheroidal catalyst product had a surface area of 232 square meters/gram, an average pore volume of 0.55 cubic centimeters/gram and an average pore diameter of 94 Angstroms, and analyzed 8 wt. % nickel and 18 wt. % tungsten.

EXAMPLE II

The charge stock utilized in this example is a blend of heavy atmospheric and light vacuum gas oils with an API gravity of 36.9° at 15.5° C., an initial boiling point of about 270° C., and an end boiling point of about 465° C. and contains 370 ppm nitrogen and 600 ppm sulfur. The charge stock is charged to a vertical tubular stainless steel reactor with an inside diameter of about 1 inch, preheated, and passed downflow through a 100 cc bed of the described catalyst at a liquid hourly space velocity of about 1, the reaction zone being maintained at an operating pressure of 2000 psig. The charge stock is charged with the reactor admixed with 9500 standard cubic feet of recycled hydrogen per barrel of charge stock. Sulfiding of the catalyst is effective in situ during processing of the sulfurous charge stock. The reactor block temperature was adjusted to 406° C. to produce a normally liquid product with a −5° F. pour point, 89 volume percent of which boiled in excess of 157° C.

We claim as our invention:

1. A catalytic composite of from about 5 to about 20 wt. % Group VIB metal or metal oxide and from about 0.1 to about 10 wt. % Group VIII metal or metal oxide on a silica-alumina carrier material, said carrier material having been prepared by:
   a. precipitating from a common aqueous solution of alumina sulfate and ammonium hydroxide having a pH of from about 5.5 to about 6.5 an insoluble basic aluminum sulfate characterized by an $SO_3Al_2O_3$ mole ratio of from about 0.4 to about 0.6 and a particle size of from about 1 to about 10 microns;
   b. suspending said insoluble basic aluminum sulfate in an acidic silica sol having a pH of from about 1 to about 3;
   c. dispersing the resultant suspension as droplets in a hot, water-immiscible suspending media, and retaining the droplets therein until they set to firm spheroidal hydrogel particles;
   d. aging the spheroidal hydrogel particles in an aqueous alkaline solution at conditions to hydrolyze residual basic aluminum sulfate contained therein; and
   e. washing, drying and calcining the aged spheroidal particles.

2. The catalytic composite of claim 1 further characterized in that said Group VIB metal or metal oxide is tungsten or an oxide thereof.

3. The catalytic composite of claim 1 further characterized in that said Group VIB metal or metal oxide is molybdenum or an oxide thereof.

4. The catalytic composite of claim 1 further characterized in that said Group VIII metal or metal oxide is nickel or an oxide thereof.

5. The catalyst composite of claim 1 further characterized in that said Group VIII metal or metal oxide is cobalt or an oxide thereof.

6. The catalytic composite of claim 1 further characterized with respect to step (b) in that said basic aluminum sulfate is utilized in an amount to provide a silica-alumina carrier material comprising up to about 60 wt. % alumina.

7. The catalytic composite of claim 1 further characterized with respect to step (d) in that said hydrogel particles are aged in said alkaline solution at a temperature of from about 50° to about 105° C.

8. The catalytic composite of claim 1 further characterized with respect to step (e) in that said aged spheroidal spheres are water-washed to reduce the sulfate content thereof to less than about 0.5 wt. %.

9. The catalytic composite of claim 1 further characterized with respect to step (e) in that said particles are calcined at a temperature of from about 325° to about 750° C. in an oxidizing atmosphere.

* * * * *